2,983,647
UROKINASE AND METHOD OF RECOVERING THE SAME

Niels Ole Kjeldgaard, Copenhagen, and Jørgen Ploug, Herlev, Denmark, assignors to Løvens kemiske Fabrik ved A. Kongsted, Copenhagen, Denmark No Drawing. Filed June 25, 1956, Ser. No. 593,363

Claims priority, application Great Britain July 1, 1955

4 Claims. (Cl. 167—73)

This invention relates to urokinase from human urine and the recovery thereof. Urokinase is also known as the plasminogen activator in urine or as the fibrinolytic activator in urine.

One object of the invention is to provide for urokinase in a highly concentrated form of such purity that solutions of the concentrate can be injected intravenously to humans without causing deleterious reactions and that by such injections fibrineous coagulations will be dissolved and thrombophlebitis will be counteracted. More specifically urokinase concentrates in dissolved or solid form, mixed or unmixed with auxiliary substances, form an object of the invention when the purity of urokinase exceeds a limit more closely defined in the following and not hitherto obtainable. A further object of the invention is to produce such concentrates in a simple and efficient way either in the form of solutions or in solid form. Further objects and purposes of our invention will appear from the following description of the manner in which it is generally carried out and of an example showing a specific method embodying our invention. Possible variations and alternatives falling within the invention will partly be pointed out in the following and partly be obvious to those skilled in the art, the invention being not restricted to the particular steps and means described.

The method for recovering urokinase in a highly concentrated form from human urine forming the subject matter of the present invention consists generally in subjecting human urine to the action of an adsorbing agent and deriving from the adsorbate thereby obtained an impure solution of urokinase having a higher specific content thereof than the urine itself, which impure solution of urokinase is then subjected to a second adsorption process. The adsorbate obtained therein is then treated with an eluating agent to produce an eluate having a pH-value between 5 and 11. The eluate thereby obtained is highly concentrated with respect to urokinase and may be used to produce in the usual manner preparations that can conveniently be stored and distributed for use in medicine. Thus the eluate may be subjected to dialysation if it has a greater content of dialysable ions than desirable, or if it contains ions or dialysable substances of an undesirable character and to evaporation to dryness to form a solid that can be injected when dissolved in sterile water, salt sotlution or a sterile solution having a suitable pH.

One manner of carrying the invention out will be described more particularly in the following.

The human urine used as a raw material may first be adjusted to a suitable pH which is preferably between 3 and 8. Any precipitate obtained thereby is separated from the urine by filtration, centrifugal separation or in any similar manner. Adjusting the pH-value in this manner may be carried out by the addition of a small amount of concentrated acid or—generally—alkali, so that only a neglectible dilution is involved.

The precipitate will generally contain no urokinase and may thus be discarded.

The urine is then contacted with an adsorbing agent capable of adsorbing urokinase. Suitable adsorbing agents are particles of silicagel or a cation-exchanging silicate. The term "silicagel" is here intended to denote the more or less finely granulated products obtained by treating solutions of alkali metal silicates with acids and washing and drying the colloidal acid thereby formed. Cation-exchanging silicates suitable for the purpose are the artificial zeolites used in the cation-exchange water-softening process, for example the "permutites" i.e. water-containing sodium aluminium silicates which can be produced by melting a mixture of silicium dioxide, kaolin and sodium carbonate or by wet processes.

For the direct adsorption of urokinase from the urine other insoluble salts than cation-exchanging silicates can also be used, preferably in the form of precipitates. It is known, for example that barium sulphate (von Kaula, J. lab. clin. med., vol. 44, page 944 (1954)) and calcium phosphate (Lundquist et al., Biochem. J., vol. 59, page 69 (1955)), can be used for this purpose.

Furthermore, we have now found that oxycellulose can as well be used for the direct adsorption of urokinase from the urine at pH-values between 3 and 7.

The adsorption by means of silicagel or cation-exchanging silicates is preferably carried out by passing the urine through a column consisting of particles of the adsorbent. When using the said other insoluble salts or oxycellulose as adsorbents, it is, however, preferable to mix them with the urine in a vessel provided with a stirrer and subject the mixture to stirring for a sufficient period of time to enable the adsorption to be completed, thereafter separating the urine from the adsorbate, for example by filtration.

In order to derive from the adsorbates thus obtained an impure solution of urokinase having a higher specific content thereof than the urine itself, the adsorbate may be subjected to a eluation process using for the eluation agent an aqueous solution having such a pH that the resulting eluate will have a pH between 9 and 11.5. In the case where oxycellulose has been used as adsorbent, pH of the eluate may be somewhat lower, preferably between 8 and 11. For the said eluation diluted aqueous solutions of ammonia have been found suitable although other alkaline aqueous solutions may serve the purpose.

The eluation is preferably carried out by passing the eluation agent through a column consisting of particles of the adsorbate, although other methods may be used, for instance, stirring the adsorbate with the eluation agent in a vessel and filtrating the mixture.

When eluating a column used for the adsorption directly from the urine it is not necessary, although preferable, to collect the eluate by fractions and discard the fractions containing but insignificant amounts of urokinase.

The eluate thus obtained or the selected fraction thereof may be used as it is for the second adsorption step, the details of which will be later described.

In order to facilitate the second adsorption and eluation operation it is, however, advantageous prior to the same to derive from the solution obtained by eluating the adsorbate obtained directly from the urine a more concentrated solution of the urokinase contained therein, the volume of the concentrate being preferably less than 10% of the volume of the said eluate or, still better, less than 5% thereof. This can be accomplished in various manners, the preferred ones being to precipitate and re-dissolve the urokinase or to freeze-dry the solution and re-dissolve the dried product, or a combination of both methods.

The said precipitation may be effected by adjusting the pH of the eluate to a value below 4, preferably 1 and 2, and adding one of the salts commonly used for precipitating proteins, for example sodium chloride or ammonium sulphate to the solution in such an amount that a precipitate containing the urokinase will be formed. A substantially complete precipitation will generally require that the solution becomes more than 50% saturated with the salt. An other manner of effecting the precipitation is to add an organic water-miscible solvent, for example, ethanol, acetone or dioxane. When using ethanol a final concentration of 80% of ethanol by volume in the solution will cause a substantially complete precipitation of the urokinase. When re-dissolving the precipitate, obtained by acidifying and salting out, the pH of the solution should be adjusted to a value between 6 and 10, preferably between 7 and 9.

Alternatively to a precipitation process of the kind described the eluate can be subjected to freeze-drying, or both precipitation and freeze-drying can be made use of with intermediate re-dissolvation of the product obtained by the one of these procedures which is first carried out.

It is advantageous also to dialyse the solution against water in order to substantially remove the electrolytes introduced during the preceeding operations.

The eluate from the first adsorption process or the more concentrated solution derived therefrom by the use of the above-described precipitation or freeze-drying and re-dissolving processes with or without additional dialysation is then subjected to another adsorption treatment.

The adsorption agent used for this purpose consists preferably of particles of a synthetic cation-exchanging resin containing a substantial amount of carboxylic groups, although other adsorption agents may be used, preferably adsorption agents, capable of exchanging cations, including the hydrogen ion. We have found that in this adsorption process and the subsequent elution process a particularly thorough purification of the urokinase is obtained when the adsorbent is one that has been pre-treated with an aqueous solution having a pH between 5 and 7.5 and a cation-strength between 0.1 and 1 gram-equivalents per liter.

Care should be taken that the amount of the impure solution of urokinase brought into contact with the resin is comparatively small, or the amount of resin comparatively great in order to secure that the pH of the solution brought into contact with the resin will be determined by the pH of the solution with which the resin has been pre-treated. The ratio between the amounts of solution and resin, respectively, clearly depends on the proportion of exchangeable ions of the former and the exchanging capacity of the latter.

Under these conditions a rather selective adsorption and upon the subsequent elution with an eluating agent producing in the eluate a pH between 5 and 11 a highly purified urokinase can be obtained.

To obtain the best results of the elution the elution agent should consist in an electrolyte solution, the pH-value or cation-strength or both of which are superior to that or those of the solution with which the resin has been equilibrated prior to adsorption.

The adsorption as well as the subsequent elution is preferably carried out in a column, and in order to obtain a sufficiently purified product, the eluate is collected by fractions and the fractions containing the main part of the urokinase are united.

To obtain the urokinase contained in these united fractions in a convenient form the solution is preferably freeze-dried, preferably after dialysation against water to substantially remove electrolytes introduced into the solutions during the preceeding operations.

It is possible thereby to obtain a freeze-dried product having a content of urokinase higher than 3000 units per milligram, measured in the units hereinafter defined. Products having a lower degree of purity are not recommendable for injection purposes.

The contents of urokinase herein indicated were determined by the following modification of Fletcher's clot dissolution method (Fletcher, Biochem, J., vol. 56, page 677 (1954)). In a 9×100 mm. test tube is mixed (A) 0.5 ml. of a 0.1 molar phosphate buffer solution having pH=7.2, (B) 0.01 to 0.1 ml. of the urokinase solution, (C) 0.1 ml. of a thrombine solution containing 100 NIH units/ml., and (D) 1.0 ml. of a 0.8% bovine fibrinogen solution. The test tube is then incubated at 37° C. After 1 minute the solution is gelated to a homogenous coagulum, and a glass ball having a diameter of 7 mm. is placed upon the surface of the coagulum. The lysis time is measured as the time when the ball, without any shaking of the tube, reaches the bottom of the tube. Due to the difficulties in procuring fibrinogen having reproducible lytic properties no unit can be defined on the basis of the clot lysis time alone. Consequently, an arbitrarily chosen intermediate product obtained during a batch employing the method according to the invention was chosen as a reference standard with its activity indicated in arbitrary units. Compared with this standard normal urine was found to contain about 5 of these units per ml.

For urine this method only renders approximate results, and therefore, for determining the content of urokinase in urine it is preferable to apply the fibrin plate method described by S. Müllertz in Acta Physiologica Scandinavia, vol. 25, page 93 (1952).

*Example*

To 300 liter of normal male urine was added the necessary amount of a 28% solution of NaOH for adjusting the pH of the urine to 7.5. Thereby, a voluminous precipitate containing no urokinase was formed. This precipitate was separated from the urine by filtration. Through a 3" × 25" column of silica gel was passed 5 liters 5% hydrochloric acid, 5 liters water, and 5 liters of a 10% solution of NaCl in the indicated sequence. Thereafter, the filtered urine was passed through the column at a flow rate of 500 ml. per minute. Thereby about 90% of the urokinase contained in the urine was adsorbed on the silica-gel, which could be ascertained by determining the content of urokinase in the filtered urine and in the urine leaving the column by means of the fibrine plate method hereinbefore indicated. Thereafter, the column was washed with water and subsequently eluated with a 4% aqueous solution of ammonia at a flow rate of 150 ml. per minute. The first, slightly yellowish, fractions, about 2 liters, contained no urokinase and were discarded. Thereafter, accompanied by a rapid change in pH, about 2 liters of a brownish eluate containing about 70% of the urokinase in the urine were collected. To this eluate was added 20% of its weight of solid sodium chloride, and hydrochloride acid was added to the solution until its pH was about 1.5. Thereby, a voluminous precipitate containing all the urokinase in the solution was formed. The precipitate was separated from the solution by filtration and dissolved in water by adding a diluted solution of NaOH until pH about 8. Undissolved substances (mainly silicic acid) was removed from the solution by centrifugation, and the reddish-brown supernatant was dialized overnight against distilled water. The dialized solution was freeze-dried, whereby 2–3 g. of dried product were obtained having an activity of 400–700 units/mg.

As cation-exchanging resin for the second adsorption operation "Amberlite IRC 50 (XE–97)" was employed, which material had been obtained from Rohm & Hass, Philadelphia, Pa. This resin was screened on a 200 mesh sieve to remove the finest particles. Thereafter, it was treated as described by Hirs, Moore and Stein (J.B.C., vol. 200, page 493 (1953)), and subsequently treated with a buffer solution containing 5.4 g. $Na_2HPO_4 \cdot 2H_2O$, 8.5 g. $Na_2HPO_4$ and 5.8 g. NaCl per liter. This solution had pH=6.2 and a cation-strength of about 0.23 gram-equivalents/liter. Of the resin thus pretreated the amount sufficient for forming a 2 × 41 cm. column was suspended in the same buffer solution, and the suspension was filled into a chromatographic tube and allowed to settle by gravity. Excess of liquid was drained off, and thereafter about 4 g. crude urokinase obtained by the freeze-drying hereinbefore mentioned and dissolved in 40 ml. of the said buffer solution were passed through the column. Thereafter, the column was washed with 100 ml. of the said buffer solution, whereby most of the proteins and the colored material was removed from the column. The column was then eluated with a 0.5 molar solution of sodium chloride, and the eluate collected in fractions in each of which the content of urokinase was determined. The fractions containing the main part of the urokinase were united, dialized against distilled water and freeze-dried. Thereby about 150 mg. urokinase were obtained having an activity of about 10,000 units/mg.

We claim:

1. A method for recovering urokinase in a highly concentrated form from human urine, comprising the steps of contacting urine the pH of which has been adjusted to a value between 3 and 8 with an adsorbing agent, eluating the adsorbate thereby obtained to form an eluate having a pH between 9 and 11.5, deriving from a fraction of the eluate having a higher specific content of urokinase than the urine itself, an impure solution of urokinase having a concentration with respect to urokinase not less than 10 times that of the eluate, subjecting said solution to a second adsorption process by means of a resorbing agent having cation-changing properties and having been pre-treated with an aqueous solution having a pH between 5 and 7.5 and a cation-strength between 0.1 and 1 gram-equivalents per liter, and eluating the adsorbate thereby obtained with an eluating agent to produce an eluate having a pH-value between 5 and 11.

2. A method for recovering urokinase in a highly concentrated form from human urine, comprising the steps of contacting human urine, the pH of which has been adjusted to a value between 3 and 8, with an adsorbing agent selected from the class consisting of silicagel and a cation-exchanging silicate, eluating the adsorbate thereby obtained to form an eluate having a pH between 9 and 11.5, deriving from a fraction of the eluate having a higher specific content of urokinase than the urine itself, an impure solution of urokinase having a concentration with respect to urokinase not less than 10 times that of the eluate, subjecting said solution to a second adsorption process by means of a resorbing agent having cation-changing properties and having been pre-treated with an aqueous solution having a pH between 5 and 7.5 and a cation-strength between 0.1 and 1 gram-equivalents per liter, and eluating the adsorbate thereby obtained with an eluating agent to produce an eluate having a pH-value between 5 and 11.

3. An injectable composition of matter containing, as the active component, urokinase in a minimum strength of higher than 3000 units per mg.

4. An injectable composition of matter conaining, as the active component, urokinase in a minimum strength of 10,000 units per mg.

References Cited in the file of this patent

Proc. Soc. of Exp. Biol. & Med., vol. 81, No. 3, December 1952, pp. 675 to 678.

Jour. of Lab. & Clin. Medicine, vol. 44, 1954, p. 944.

Methods in Enzymology, vol. 1, by Colowick et al., published by Academic Press, Inc., (N.Y.), 1955, pp. 113 to 118.

Biochemical Journal, vol. 59, pp. 69 to 71, 1955.